(12) United States Patent
Chou (10) Patent No.: US 8,805,384 B2
(45) Date of Patent: Aug. 12, 2014

(54) INTER-RAT COVERAGE DETERMINATION FOR ENERGY SAVING MANAGEMENT

(71) Applicant: Intel Corporation, Santa Clara, CA (US)

(72) Inventor: Joey Chou, Scottsdale, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/730,248

(22) Filed: Dec. 28, 2012

(65) Prior Publication Data

US 2013/0288690 A1    Oct. 31, 2013

Related U.S. Application Data

(60) Provisional application No. 61/639,795, filed on Apr. 27, 2012.

(51) Int. Cl.
*H04W 40/00* (2009.01)

(52) U.S. Cl.
USPC ............ 455/446; 455/574; 455/436; 455/440

(58) Field of Classification Search
USPC ............. 455/414.1, 432.1, 432.2, 432.3, 436, 455/437, 438, 439, 442, 443, 446, 574, 561
See application file for complete search history.

(56) References Cited

U.S. PATENT DOCUMENTS

| | | | |
|---|---|---|---|
| 2009/0274070 A1* | 11/2009 | Mukherjee et al. | 370/257 |
| 2010/0046428 A1* | 2/2010 | Lee et al. | 370/328 |
| 2013/0252660 A1* | 9/2013 | Bach | 455/525 |

FOREIGN PATENT DOCUMENTS

| | | |
|---|---|---|
| EP | 2247142 A1 | 11/2010 |
| EP | 2278836 A1 | 1/2011 |
| WO | 2010021507 A2 | 2/2010 |

OTHER PUBLICATIONS

3GPP, "3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP TS 32.522 V11.3.0, Sep. 21, 2012, Lte Advanced, 50 pages.

3GPP, "3rd Generation Partnership Project; Technical Specification Group Services and System Aspects; Telecommunication management; Energy Saving Management (ESM); Concepts and requirements (Release 11)," 3GPP TS 32.551 V11.2.0, Sep. 21, 2012, Lte Advanced, 25 pages.

(Continued)

*Primary Examiner* — Kathy Wang-Hurst
(74) *Attorney, Agent, or Firm* — Schwabe, Williamson & Wyatt, P.C.

(57) ABSTRACT

Embodiments of systems and techniques are described for determining inter-radio access technology (inter-RAT) coverage for energy saving management (ESM). In some embodiments, a network management (NM) apparatus may determine that a source cell of a network of a first RAT is triggered to activate an energy saving state and that the source cell is partially overlapped by each of a plurality of cells of one or more networks of one or more RATs different from the first RAT. The NM apparatus may instruct the source cell to activate the energy saving state when a combination of the plurality of cells provides coverage of the source cell. Other embodiments may be described and claimed.

28 Claims, 6 Drawing Sheets

(56) References Cited

OTHER PUBLICATIONS

3GPP, "3rd Generation Partnership Project; Technical Specification Group Services and System Aspects; Telecommunication management; Configuration Management (CM); UTRAN network resources Integration Reference Point (IRP); Network Resource Model (NRM) (Release 11)," 3GPP TS 32.642 V11.3.0, Sep. 21, 2012, Lte Advanced, 49 pages.

3GPP, "3rd Generation Partnership Project; Technical Specification Group Services and System Aspects; Telecommunication management; Configuration Management (CM); GERAN network resources Integration Reference Point (IRP); Network Resource Model (NRM) (Release 11)," 3GPP TS 32.652 V11.2.0, Sep. 21, 2012, Lte Advanced, 21 pages.

Office Action for French Patent Application No. 1353736, mailed on Aug. 21, 2013.

International Search Report and Written Opinion for International App. No. PCT/US2013/038293, mailed Jun. 3, 2013.

Office Action mailed Feb. 7, 2014 from Spanish Patent Application No. 201330610.

\* cited by examiner

INTER-RAT COVERAGE DETERMINATION FOR ENERGY SAVING MANAGEMENT

CROSS-REFERENCE TO RELATED APPLICATION

This application claims priority to U.S. Provisional Patent Application No. 61/639,795, entitled "Advanced Wireless Communication Systems and Techniques" and filed Apr. 27, 2012, the contents of which are hereby incorporated by reference in their entirety herein.

TECHNICAL FIELD

The present disclosure relates generally to wireless communication, and more particularly, to systems and techniques for inter-radio access technology (inter-RAT) coverage determination for energy saving management (ESM).

BACKGROUND

ESM techniques have been deployed in wireless communications systems to switch off components (such as Third Generation Partnership Project Long Term Evolution (3GPP LTE) or other "hot spot" cells) that are lightly used at off-peak hours. When such components are switched off, legacy wireless communication system cells may be relied on to provide services to subscribers. Examples of such legacy system cells may include universal mobile telecommunications system terrestrial radio access network (UTRAN) cells or global system for mobile communications enhanced data rates for global system for mobile communication evolved radio access networks (GERAN) cells. Existing ESM techniques typically assume that the coverage of a legacy cell will wholly encompass a hot spot cell, and thus that the coverage of a switched-off hot spot cell can be taken over by a single legacy cell. When this assumption fails, existing ESM techniques may prevent legacy cell-covered components from switching off, resulting in wasted energy.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of systems and techniques are described for determining inter-RAT coverage for ESM. In some embodiments, a network management (NM) apparatus may determine that a source cell of a first RAT is triggered to activate an energy saving state (ESS) and that the source cell is partially overlapped by each of a plurality of cells of one more networks of one or more RATs different from the first RAT. The NM apparatus may instruct the source cell to activate the ESS when a combination of the plurality of cells provides coverage of the source cell. Other embodiments may be described and claimed.

The systems and techniques disclosed herein may decrease energy consumption in wireless communication networks by allowing source cells to go into an ESS when they are covered by a combination of multiple cells of a different RAT. The systems and techniques disclosed herein may also improve resource management in multi-RAT environments by identifying which cells are covered by a combination of multiple cells of other RATs and thereby providing a more complete picture of coverage across the multiple RATs. The present disclosure may be particularly advantageous in self-organizing network (SON) applications, including those in which network optimization is centralized in one or more NM apparatus or other devices.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As may be used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
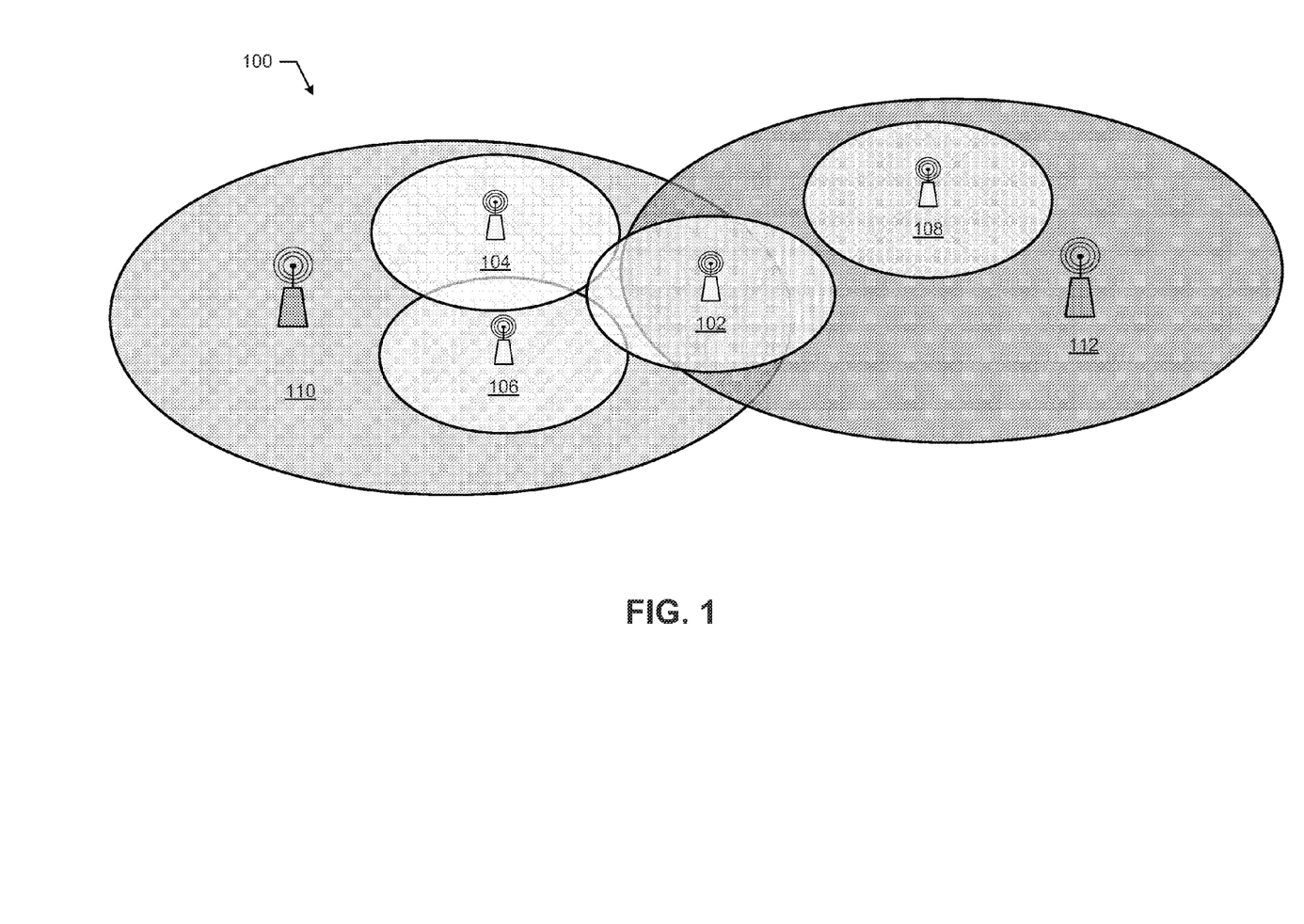
FIG. 1 illustrates an environment in which a cell of a first RAT is covered by a combination of two cells of RATs different from the first RAT, in accordance with various embodiments.

Referring now to FIG. 1, an environment 100 is illustrated in which a number of cells 102, 104, 106 and 108 of a first RAT variously overlap with cells 110 and 112 of one or more RATs different than the first RAT. For example, cells 102, 104, 106 and 108 may be E-UTRAN cells, while cell 110 may be a UTRAN cell and cell 112 may be a GERAN cell.

In some embodiments, cell 102 may be triggered to activate an ESS. Prior to the trigger, cell 102 may not be in an ESS, and may instead be in a default state that is configured to handle normal or peak traffic situations. In an ESS, some functions or resources of cell 102 may be switched off or otherwise restricted. The specific functions or resources restricted, and the degree of restriction, may vary by cell type and usage history, among other variables. The ESS associated with cell 102 may be such that cell 102 can no longer provide wireless communication service to user equipment (UE) previously served by cell 102. For example, an evolved nodeB (eNB) associated with cell 102 or other related circuitry (such as an antenna) may be transitioned to a low power state. In an ESS, cell 102 may not be visible to any UEs in its nominal coverage area. In order to avoid service disruptions, in some embodiments, the coverage area of cell 102 must be covered by one or more other cells to which the UE may be offloaded before cell 102 may be allowed to activate an ESS.

In environment 100, no one of the other first RAT cells 104, 106 and 108 may cover cell 102, nor may any combination of first RAT cells 104, 106 and 108. Thus, it may not be possible for the UE currently served by cell 102 to be offloaded via intra-RAT transfer. Additionally, neither cell 110 nor cell 112 (of one or more networks of one or more RATs different from the first RAT associated with cell 102) individually may cover cell 102. However, cells 110 and 112 may cover cell 102 when cells 110 and 112 are taken together. In some embodiments, upon a determination that two or more cells of a RAT different from the first RAT cover cell 102, the UE originally served by cell 102 may be offloaded to cells 110 and 112 via an inter-RAT handover and cell 102 may activate an ESS. The distribution of traffic from the source cell to cells 110 and 112 may be based on the traffic loads of cells 110 and 112 (e.g., to balance the loads on cells 110 and 112), for example. Additional embodiments are described herein.

Figure 2A:
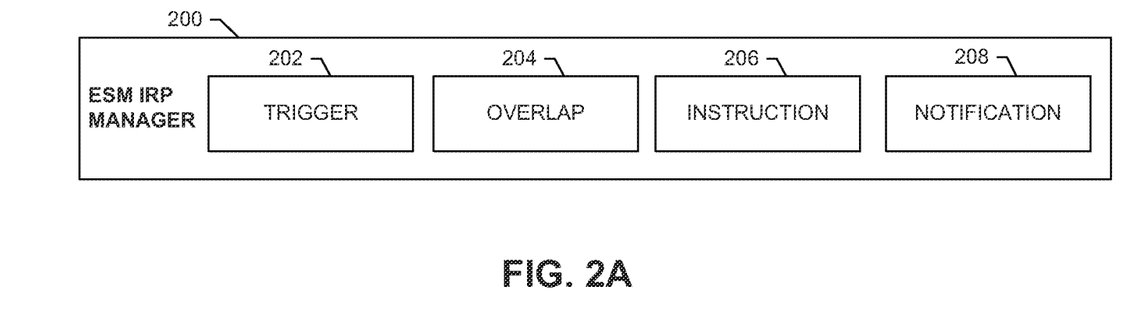
FIGS. 2A and 2B are block diagrams illustrating example ESM integration reference point (IRP) manager and agent modules, respectively, in accordance with various embodiments.
Figure 2B:
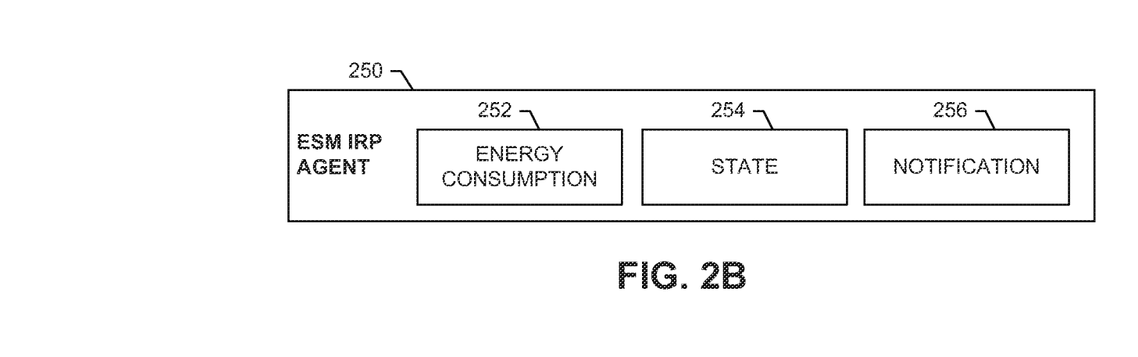

Referring now to FIGS. 2A and 2B, block diagrams of example ESM integration reference point (IRP) manager module 200 and agent module 250 are illustrated, respectively, in accordance with various embodiments. In some embodiments, the inter-RAT ESM processes described herein may be performed in whole or in part by interactions between ESM integration IRP manager module 200 and ESM IRP agent module 250. In some embodiments, ESM IRP agent module 250 may encapsulate a set of ESM functions for one or more network elements (NEs). NEs may include communication system entities that may include one or more devices. Examples of NEs may include eNBs, UEs, switches, routers, or any other communication system component. ESM IRP agent module 250 may be integrated with an NE, or integrated with a computing device separate from the NE. In some embodiments, ESM IRP manager module 200 may use information provided by one or more ESM IRP agents (such as ESM IRP agent module 250) for any of a number of applications, including configuring trigger conditions for ESS transitions for different NEs. A number of functions that may be performed by ESM IRP manager module 200 are described herein.

ESM IRP manager module 200 and/or agent module 250 may be included at any of a number of different levels in a wireless communication system (such as a network management (NM) level or an element management (EM) level) in any of a number of different apparatuses. For example, in some wireless communication systems, ESM processes may be centralized at the NM level in one or more NM apparatuses; in such systems, ESM IRP manager module 200 may provide instructions to NEs in the system to move to an ESS and set trigger conditions under which NEs may transition to an ESS, while ESM IRP agent module 250 may provide condition information to ESM IRP manager module 200 and receive instructions for certain NEs to transition to an ESS. In some wireless communication system, ESM processes may be centralized at the EM level (e.g., in one or more EM apparatuses) or distributed among NEs; in such systems, ESM IRP manager module 200 may set trigger conditions under which NEs may transition to an ESS, while ESM IRP agent module 250 may use these trigger conditions to control ESM functions within the NEs.

Various components of ESM IRP manager module 200 and ESM IRP agent module 250 are now discussed with reference to FIGS. 2A and 2B. The components illustrated in FIGS. 2A and 2B are examples, and any one or more components may be omitted, or additional components included, in accordance with the disclosed embodiments. In some embodiments, a single NE includes at least some of the functionality of both ESM IRP manager module 200 and ESM IRP agent module 250 and may make ESM decisions autonomously.

Referring to FIG. 2A, illustrative components of ESM IRP manager module 200 are shown. ESM IRP manager module 200 may include trigger module 202. Trigger module 202 may be configured to determine that source cell of a first RAT is triggered to activate an ESS. As discussed above, an ESS may be a state in which some functions of the source cell are restricted in resource usage. In some embodiments, the source cell may be triggered when one or more operating conditions (constituting a trigger point) are met. For example, the source cell may be triggered when the load on the source cell crosses below a load threshold, when the loads on neighboring cells remain below certain load thresholds, when the time of day is one in which ES techniques are allowed to be implemented (e.g., at night), whether the first RAT is prioritized for ESM over one or more other RATs monitored by ESM IRP manager module 200, or any combination of such conditions. In some embodiments, the network of the first RAT may be an E-UTRAN. In some embodiments, the network of the first RAT may be an UTRAN. In some embodiments, trigger module 202 may be configured to determine whether the source cell (e.g., an eNB serving the source cell) supports inter-RAT ES (e.g., whether the source cell includes modules providing one or more inter-RAT ES functions). This determination may occur before, after, or as part of the determination of whether the source cell is triggered to activate an ESS.

In some embodiments in which ESM IRP manager module 200 is included at an EM-level, such as with an eNB, trigger module 202 may be configured to determine when operating conditions within the source cell have reached a trigger point at which the source cell should activate an ESS. In some embodiments, ESM IRP manager module 200 may be included at an NM-level.

ESM IRP manager module 200 may include an overlap module 204. Overlap module 204 may be configured to determine whether a source cell is partially overlapped by each of a plurality of cells of one or more networks of one or more RATs different from the first RAT (i.e., the RAT of the source cell). In some embodiments, the one or more networks of the one or more RATs different from the first RAT may include a UTRAN and/or a GERAN. For example, an E-UTRAN source cell may be overlapped by UTRAN and/or GERAN cells in environments in which the source cell provides capacity enhancement to, but does not cover, the UTRAN and/or GERAN cells (e.g., as illustrated by first RAT cell 102 with respect to other RAT cells 110 and 112 of FIG. 1). In some embodiments, a first portion of an E-UTRAN source cell may be covered by one UTRAN or GERAN cell, a second portion of the E-UTRAN source cell may be covered by another UTRAN or GERAN cell, and a third portion of the E-UTRAN source cell may be covered by both UTRAN or GERAN cells.

Overlap module 204 may be further configured to determine whether the plurality of cells partially overlapping the source cell provides coverage of the source cell. Coverage may be complete coverage, substantially complete coverage, or sufficient coverage, for example. In some embodiments, overlap module 204 may store a value of an energy-saving-coverage (ES-coverage) attribute for each target cell proximate to a source cell. In some embodiments, a target cell may be adjacent to a source cell. The value of the ES-coverage attribute may indicate whether and how the target cell may serve as a candidate cell for taking over coverage for the source cell if the source cell activates an ESS. In some embodiments, a value for an ES-coverage attribute may be defined between each pair of cells.

For example, in some embodiments, an ES-coverage attribute for an target cell (relative to a source cell) may take one of three values: "yes," "partial" and "no." A value of "yes" may indicate that the target cell is recommended to be considered as a candidate cell to take over coverage when the source cell is about to transferred to an ESS. A value of "partial" may indicate that the target cell is recommended along with at least one other target cell to be considered as an entirety of candidate cells to take over coverage when the source cell is about to be transferred to an ESS. A value of "no" may indicate that the target cell is not recommended to be considered as a candidate cell to take over coverage when the source cell is about to be transferred to an ESS nor is the target cell recommended along with at least one other target cell to be considered as an entirety of candidate cells to take over coverage when the source cell is about to be transferred to an ESS.

To illustrate one implementation of such ES-coverage attributes, Table 1 provides a list of an attribute labeled "IsESCoveredBy" for the cells illustrated in FIG. 1. The italicized entries in Table 1 indicate inter-RAT ES-coverage attributes (for the purposes of Table 1, an embodiment is considered in which cell 110 and cell 112 are of one or more networks of the same RAT, such as a UTRAN or a GERAN.

TABLE 1

Values of ES-coverage attribute IsESCoveredBy for various source and target cells of FIG. 1.

| ES-coverage attribute | Value |
|---|---|
| Cell 102 IsESCoveredBy Cell 104 | Partial |
| Cell 102 IsESCoveredBy Cell 106 | Partial |
| Cell 102 IsESCoveredBy Cell 108 | No |
| Cell 102 IsESCoveredBy Cell 110 | Partial |
| Cell 102 IsESCoveredBy Cell 112 | Partial |
| Cell 104 IsESCoveredBy Cell 102 | Partial |
| Cell 104 IsESCoveredBy Cell 106 | Partial |
| Cell 104 IsESCoveredBy Cell 108 | No |
| Cell 104 IsESCoveredBy Cell 110 | Yes |
| Cell 104 IsESCoveredBy Cell 112 | No |
| Cell 106 IsESCoveredBy Cell 102 | Partial |
| Cell 106 IsESCoveredBy Cell 104 | Partial |
| Cell 106 IsESCoveredBy Cell 108 | No |
| Cell 106 IsESCoveredBy Cell 110 | Yes |
| Cell 106 IsESCoveredBy Cell 112 | No |
| Cell 108 IsESCoveredBy Cell 102 | No |
| Cell 108 IsESCoveredBy Cell 104 | No |
| Cell 108 IsESCoveredBy Cell 106 | No |
| Cell 108 IsESCoveredBy Cell 110 | No |
| Cell 108 IsESCoveredBy Cell 112 | Yes |
| Cell 110 IsESCoveredBy Cell 102 | Partial |
| Cell 110 IsESCoveredBy Cell 104 | Partial |
| Cell 110 IsESCoveredBy Cell 106 | Partial |
| Cell 110 IsESCoveredBy Cell 108 | No |
| Cell 110 IsESCoveredBy Cell 112 | No |
| Cell 112 IsESCoveredBy Cell 102 | Partial |
| Cell 112 IsESCoveredBy Cell 104 | No |
| Cell 112 IsESCoveredBy Cell 106 | No |
| Cell 112 IsESCoveredBy Cell 108 | Partial |
| Cell 112 IsESCoveredBy Cell 110 | No |

A number of techniques which may be executed by overlap module 204 to identify and store information about overlapping relationships between a source cell and proximate target cells, including techniques for storing ES-coverage attributes, are described below with reference to FIG. 4.

ESM IRP manager module 200 may include instruction module 206. Instruction module 206 may be configured to instruct a source cell or other NE to activate an ESS. In some embodiments, instruction module 206 may only provide such an instruction when sufficient trigger determinations have been made by trigger module 202 and sufficient overlap determinations have been made by overlap module 204. In some embodiments, instruction module 206 may be configured to instruct the source cell to deactivate an ESS. An instruction to deactivate an ESS may be based on, for example, a traffic load of one or more of the other RAT cells to which the source cell's traffic was offloaded (e.g., when one of the other RAT cells becomes overburdened), or based on an operational status of one or more of the other RAT cells (e.g., when one or more of the other RAT cells experiences an operational failure).

ESM IRP manager module 200 may include notification module 208. Notification module 208 may be configured to transmit a notification message, for display to a network operator (e.g., on a visual display device), when the source cell has activated an ESS. In some embodiments, notification module 208 may be configured to notify an NM-level component when an eNB or other device related to the source cell has activated an ESS. In some embodiments, notification module 208 may be configured to notify an NM-level or EM-level component, for example, of the identities of the plurality of other RAT cells that provide coverage of the source cell (e.g., by providing cell identifiers for cells 110 and 112 when cell 102 enters an ESS in FIG. 1). Notification module 208 may configure a desired notification schedule for ES-function related information (such as load on NEs) and transmit the notification schedule to ESM IRP agent modules (such as ESM IRP agent module 250). Notification module 208 may receive such ES-function related information from ESM IRP agent modules (e.g., activation and deactivation of ESS for network elements for which the ESM IRP agent is responsible).

Referring to FIG. 2B, illustrative components of ESM IRP agent module 250 are shown. ESM IRP agent module 250 may include energy consumption module 252. In some embodiments, energy consumption module 252 may be configured to provide information about the energy consumption of NEs to ESM IRP manager module 200. In some embodiments, energy consumption module 252 may be configured to receive information about energy consumption from the NEs themselves, and/or aid ESM IRP manager module 200 in accessing this information from the NEs. Energy consumption information may be used to determine appropriate thresholds for activating and deactivating ESSs, and determining when these thresholds have been met, for example.

ESM IRP agent module 250 may include state module 254. In some embodiments, state module 254 may be configured to provide information to ESM IRP manager 200 about the current state of NEs for which ESM IRP agent module 250 is responsible. Example states include an ESS, a default (non-ESS) state, a compensating state (in which the NE is compensating for one or more other NEs that have activated their own ESS), or a number of other states relating to the activation or deactivation of ES functions. In some embodiments, state module 254 may be configured to store state information in a memory.

ESM IRP agent module 250 may include notification module 256. In some embodiments, notification module 256 may be configured to provide a notification to ESM IRP manager module 200 when the source cell has activated an ESS (e.g., by pushing a notification or responding to a query for a notification). Notification module 256 may receive a desired notification schedule for ES-function related information from ESM IRP manager module 200. Notification module 256 may provide ES-function related information, such as activation and deactivation of ESS for NEs for which ESM IRP agent module 250 is responsible.

Figure 3:
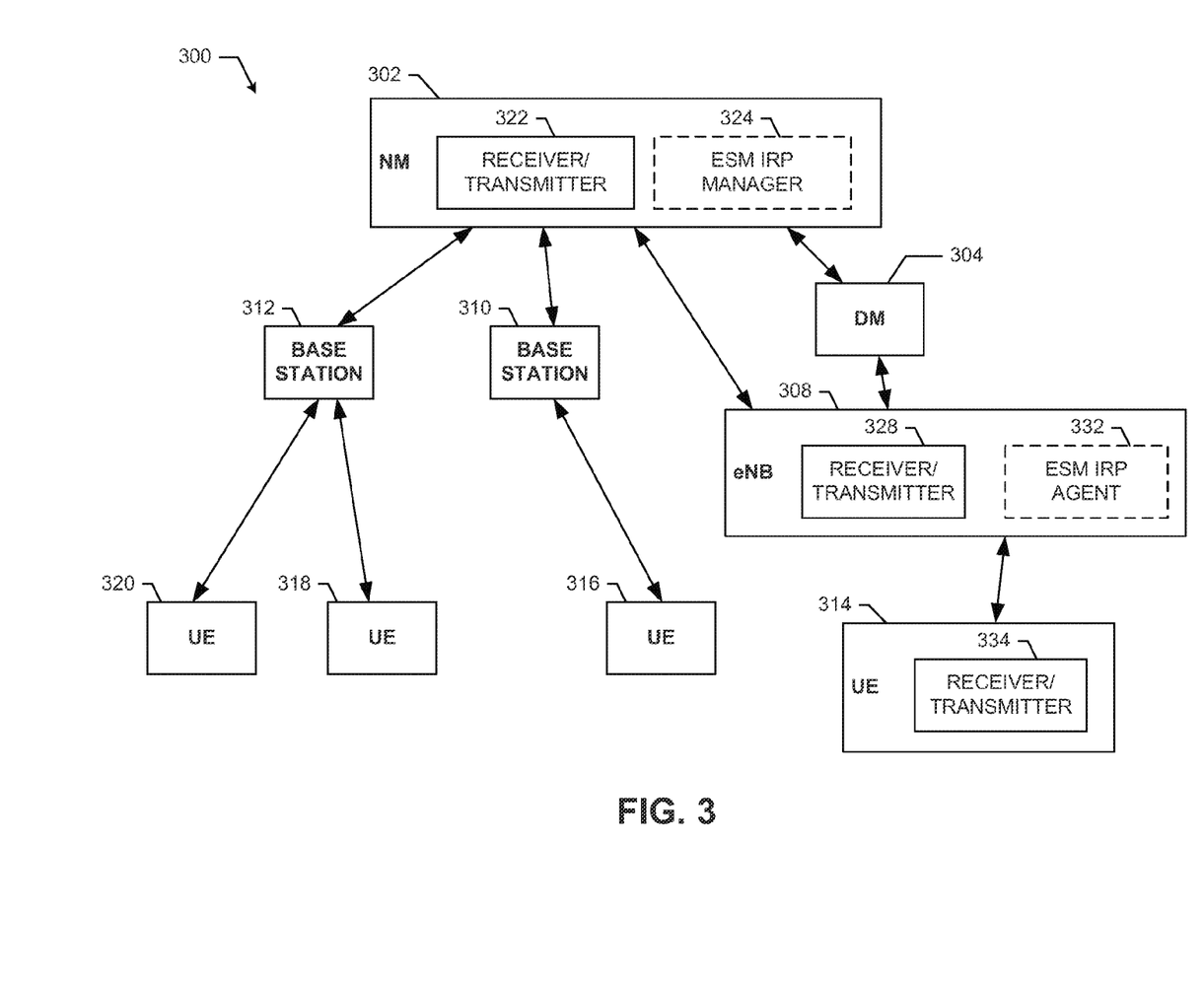
FIG. 3 is a block diagram illustrating an example system for inter-RAT ESM, in accordance with various embodiments.

Referring now to FIG. 3, a block diagram of an example system 300 for inter-RAT ESM is illustrated, in accordance with various embodiments. As discussed above, an ESM IRP manager module (such as ESM IRP manager module 200 of FIG. 2) and/or an ESM IRP agent module (such as ESM IRP agent module 250 of FIG. 2) may be implemented in any of a number of levels and components within a wireless communication system. Exemplary implementations of ESM IRP manager modules and ESM IRP agent modules are indicated in FIG. 3, but all implementations are only illustrative and any one or more implementations may be omitted while others may be included.

System 300 may be configured to support networks of one or more RATs, such as an E-UTRAN. In some embodiments, the RAT(s) supported by system 300 may include the first RAT of cells 102, 104, 106 and 108 in environment 100, and/or the RATs of cells 110 and 112 (FIG. 1). System 300 may be configured to deliver any of a number of services, such as multimedia delivery over HTTP, live streaming over RTP, conversational services (e.g., video conferencing), and TV broadcasting, for example. System 300 may include other wireless personal area network (WPAN), wireless local area network (WLAN), wireless metropolitan area network (WMAN), and/or wireless wide area network (WWAN) devices such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system.

System 300 may include an NM apparatus 302. In some embodiments, NM apparatus 302 may monitor the components of system 300 and collect measurements of their performance and the relationships between the components. Based on the analysis of these measurements and relationships, NM apparatus 302 may identify potential problems and improvements in the configuration and operation of the components of system 300, and may implement changes to system 300.

NM apparatus 302 may include receiver/transmitter module 322. Receiver/transmitter module 322 may be configured for receiving and transmitting signals to and from other devices by wired or wireless connections. For example, receiver/transmitter module 322 may be configured to receive signals from or transmit signals to an element manager (EM) component of an eNB (such as eNB 308), a base station (such as any of base stations 310 and 312), a domain management (DM) apparatus 304 (which may provide management functions for a domain or other portion of system 300, and may itself include an ESM IRP manager module and/or an ESM IRP agent module, not shown), or any other suitably configured devices. In some embodiments, NM apparatus 302 may communicate with an eNB via a wired connection. In some embodiments, receiver/transmitter module 322 may include separate receiver circuitry and transmitter circuitry. In embodiments in which receiver/transmitter module 322 is configured for wireless communications, it may include, for example, one or more directional or omni-directional antennas (not shown) such as dipole antennas, monopole antennas, patch antennas, loop antennas, microstrip antennas, and/or other types of antennas suitable for reception of radio frequency (RF) or other wireless communication signals.

NM apparatus 302 may include an ESM IRP manager module 324. ESM IRP manager module 324 may take any of the forms described above with reference to ESM IRP manager module 200 (FIG. 2). ESM IRP manager module 324 may be coupled with receiver/transmitter module 322. Additional computing device components, such as one or more processors, memory, input/output (I/O) components and displays, may be included with NM apparatus 302. Additionally, the functions of NM apparatus 302 may be distributed across multiple computing devices.

System 300 may include one or more eNBs, such as eNB 308. System 300 may also include one or more base stations, such as base stations 310 and 312. In some embodiments, one or more of base stations 310 and 312 include eNBs. eNB 308 and base stations 310 and 312 may include a number of components; for ease of illustration, only the components of eNB 308 are shown in FIG. 3. eNBs other than eNB 308 and base stations 310 and 312 may have similar components. The components of eNB 308, discussed in detail below, may be included in one or more of the eNBs and/or base stations serving any of the cells of FIG. 1, including cell 102.

As shown, eNB 308 may include receiver/transmitter module 328. Receiver/transmitter module 328 may be configured for receiving signals from and transmitting signals to other devices by wired or wireless connections. For example, receiver/transmitter module 328 may be configured to transmit and/or receive wireless signals to/from UE 314, NM apparatus 302, or other devices suitably configured for wireless communications. In embodiments in which eNB 308 is configured for wireless communications, receiver/transmitter module 328 may include, for example, one or more directional or omni-directional antennas (not shown), as discussed above with reference to receiver/transmitter 322 of NM apparatus 302.

eNB 308 may include an ESM IRP agent module 332. ESM IRP agent module 332 may take any of the forms described above with reference to ESM IRP agent module 250 (FIG. 2). ESM IRP agent module 332 may be coupled with receiver/transmitter module 328. Additional computing device components, such as one or more processors, memory, input/output (I/O) components and displays, may be included with eNB 308.

System 300 may include one or more UEs, such as UEs 314-320. One or more of UEs 314-320 may include any of a number of wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. In some embodiments, one or more of UEs 314-320 may be a mobile wireless device, such as a PDA, cellular telephone, tablet computer or laptop computer. Each of UEs 314-320 may include a number of components; for ease of illustration, only the components of UE 314 are shown in FIG. 3. UEs other than UE 314 may have similar components.

As shown, UE 314 may include receiver/transmitter module 334. Receiver/transmitter module 334 may be configured for receiving wireless signals from and transmitting wireless signals to other devices. For example, receiver/transmitter module 334 may be configured to receive wireless signals from and transmit wireless signals to eNB 308 or other devices suitably configured for wireless communications. Receiver/transmitter module 334 may include, for example, one or more directional or omni-directional antennas (not shown), as discussed above. Additional computing device components, such as one or more processors, memory, input/output (I/O) components and displays, may be included with UE 314.

Figure 4:
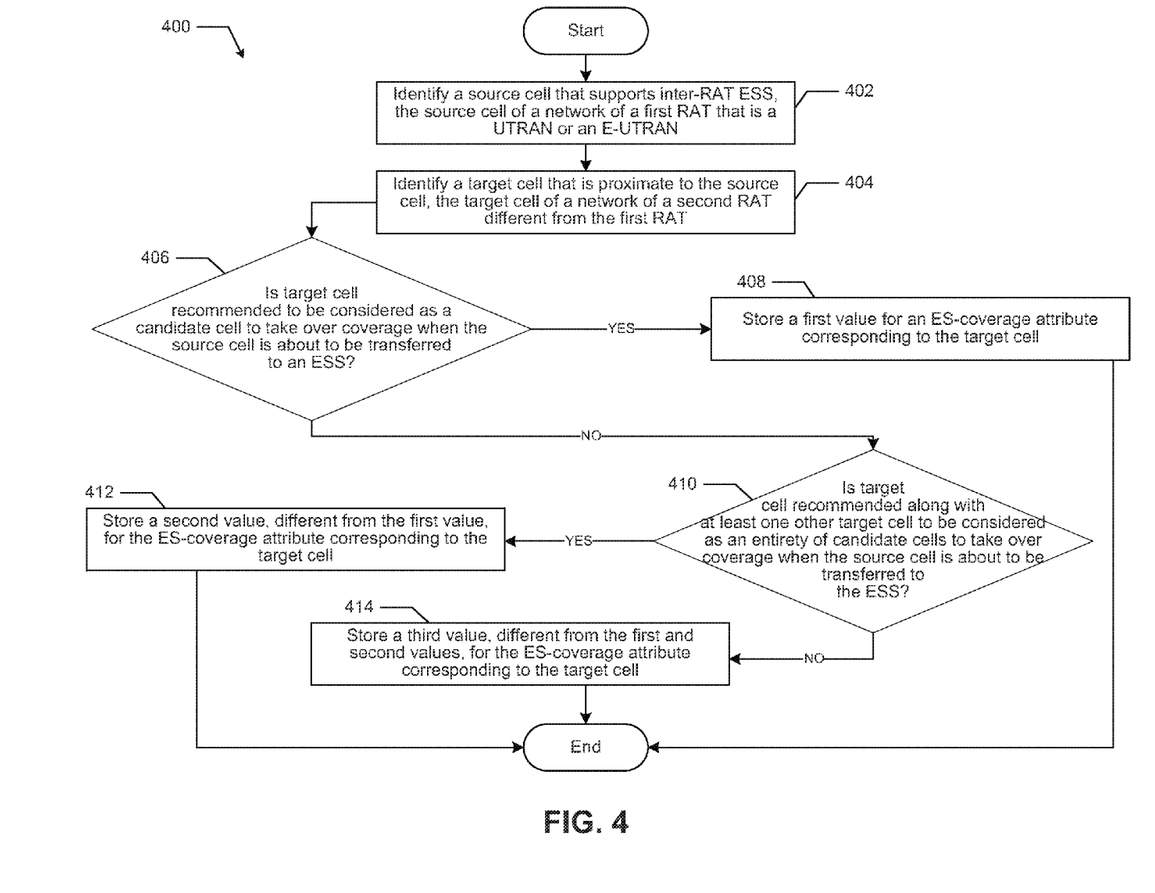
FIG. 4 is a flow diagram of a first example inter-RAT ESM process, in accordance with various embodiments.

Referring now to FIG. 4, a flow diagram of example inter-RAT ESM process 400 is illustrated, in accordance with various embodiments. Process 400 may be executed by, for example, ESM IRP manager module 200 (FIG. 2) or any of the ESM IRP manager modules described herein. Process 400 may be executed by any of a number of other components of a wireless communication system that implement some or all of the ESM IRP manager or agent functions described above. For example, process 400 may be executed by NM apparatus 302, eNB 308 or base station 310 (FIG. 3). It may be recognized that, while the operations of process 400 (and the other processes described herein) are arranged in a particular order and illustrated once each, in various embodiments, one or more of the operations may be repeated, omitted or performed out of order. For illustrative purposes, operations of process 400 may be described as performed by ESM IRP manager module 200 (FIG. 2), but process 400 may be performed by any suitably configured device.

Process 400 may begin at operation 402, in which ESM IRP manager module 200 may identify a source cell that supports inter-RAT ES. In some embodiments, operation 402 may be executed by trigger module 202 (FIG. 2) based on information received from ESM IRP agent 250 (e.g., the traffic load of one or more NEs associated with ESM IRP agent 250 is below a threshold value). In some embodiments, the source cell may be of a network of a first RAT that is a UTRAN or an E-UTRAN.

At operation 404, ESM IRP manager module 200 may identify a target cell proximate to the source cell (identified at operation 402). In some embodiments, a target cell may be adjacent to the source cell. In some embodiments, operation 404 may be executed by overlap module 204 (FIG. 2) based on information received from ESM IRP agent 250. In some embodiments, the target cell may be of a network of a second RAT that is different from the first RAT. For example, in some embodiments, the target cell may be a UTRAN cell (e.g., a frequency division duplex (FDD) mode cell, a low chip rate time division duplex (TDD) mode cell, or a high chip rate TDD mode cell). In some embodiments, the target cell may be a GERAN cell.

At operation 406, ESM IRP manager module 200 may determine whether the target cell (identified at operation 404) is recommended to be considered as a candidate cell to take over coverage when the source cell is about to be transferred to an ESS. In some embodiments, operation 404 may be executed by overlap module 204 (FIG. 2) based on information received from ESM IRP agent 250. If yes, ESM IRP manager module 200 may proceed to operation 408 and store a first value for an energy-saving-coverage (ES-coverage) attribute corresponding to the target cell (such as the "IsCoveredBy" attribute discussed above with reference to Table 1). For example, the first value may be "yes." In some embodiments, the first value may be stored in a memory accessible by overlap module 204, from which it may be later retrieved if the source cell is triggered to activate an ESS. In some embodiments, the ES-coverage attribute may be part of an information object class (IOC) containing radio network-related parameters. Process 400 may then end.

If ESM IRP manager module 200 determines at operation 406 that the target cell (identified at operation 404) is not recommended to be considered as a candidate cell to take over coverage when the source cell is about to be transferred to an ESS, ESM IRP manager module 200 may proceed to operation 410 and determine whether the target cell is recommended along with at least one other target cell to be considered as an entirety of candidate cells to take over coverage when the source cell is about to be transferred to the ESS. In some embodiments, operation 404 may be executed by overlap module 204 (FIG. 2) based on information received from ESM IRP agent 250. If yes, ESM IRP manager module 200 may proceed to operation 412 and store a second value, different from the first value (stored at operation 408), for the ES-coverage attribute corresponding to the target cell (such as the "IsCoveredBy" attribute discussed above with reference to Table 1). For example, the second value may be "partial." In some embodiments, a source cell that has a "partial" attribute with a target cell will have a "partial" attribute with at least one more target cell. Process 400 may then end.

If ESM IRP manager module 200 determines at operation 410 that the target cell is not recommended along with at least one other target cell to be considered as an entirety of candidate cells to take over coverage when the source cell is about to be transferred to the ESS, ESM IRP manager module 200 may proceed to operation 414 and store a third value, different from the first and second values (of operations 408 and 412, respectively), for the ES-coverage attribute corresponding to the target cell if the target cell is not recommended to be considered as a candidate cell to take over coverage when the source cell is about to be transferred to an energy saving state (such as the "IsCoveredBy" attribute discussed above with reference to Table 1). For example, the third value may be "no." Process 400 may then end.

In some embodiments, multiple target cells may be identified at operation 404. In such embodiments, operations 406-412 may be repeated for each of the multiple target cells. These operations may be repeated in any of a number of orders (e.g., operation 406 may be performed for each of the multiple target cells prior to performing another operation for any of the multiple target cells, or operations 406-412 may be performed for one cell, then repeated for a next cell, etc.).

Figure 5:
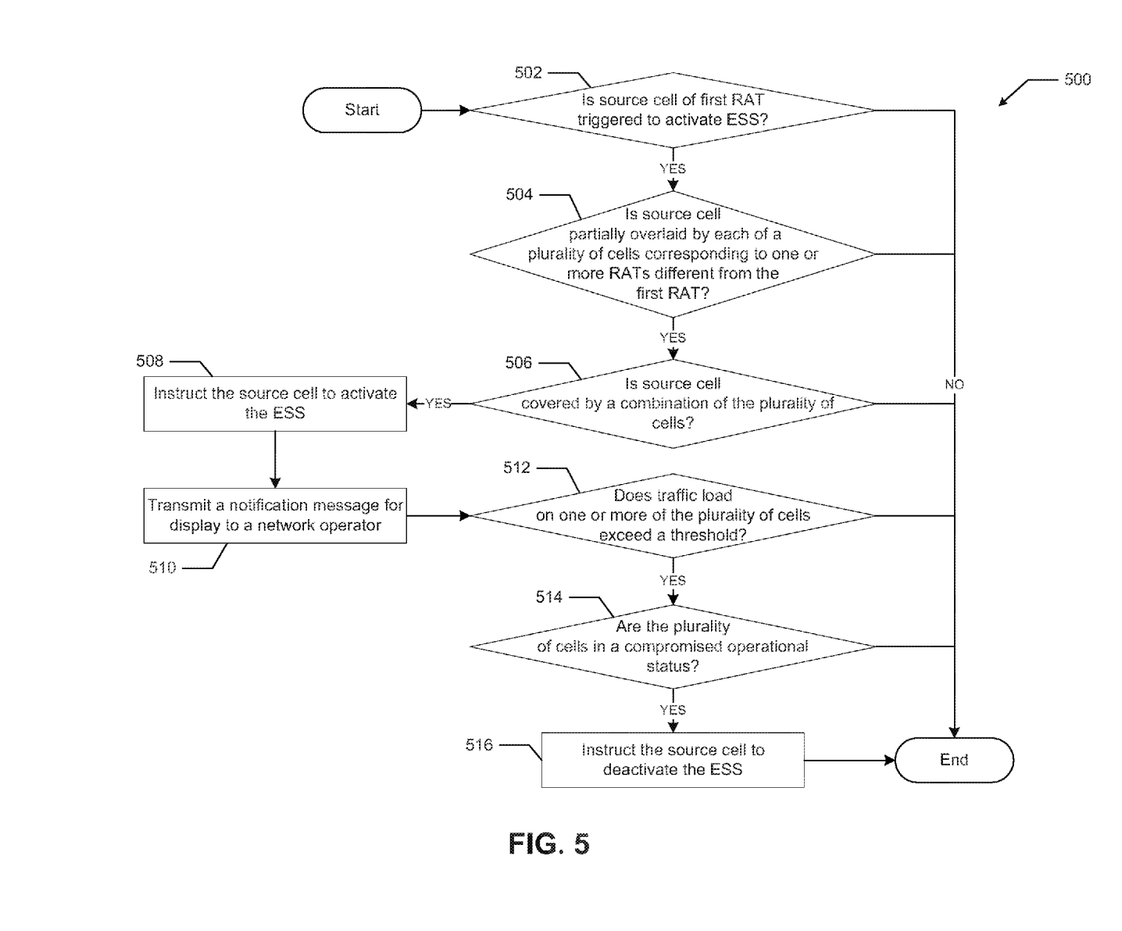
FIG. 5 is a flow diagram of a second example inter-RAT ESM process, in accordance with various embodiments.

Referring now to FIG. 5, a flow diagram of example inter-RAT ESM process 500 executable by a UE (such as UE 314 of FIG. 3) is illustrated, in accordance with various embodiments. Process 500 may be executed by, for example, ESM IRP manager module 200 (FIG. 2) or any of the ESM IRP manager modules described herein. Process 500 may be executed by any of a number of other components of a wireless communication system that implement some or all of the ESM IRP manager or agent functions described above. For example, process 500 may be executed by NM apparatus 302, eNB 308 or base station 310 (FIG. 3). For illustrative purposes, operations of process 500 may be described as performed by ESM IRP manager module 200 (FIG. 2), but process 500 may be performed by any suitably configured device.

Process 500 may begin at operation 502, at which ESM IRP manager module 200 may determine whether a source cell of a first RAT is triggered to activate an ESS. In some embodiments, operation 502 may be executed by trigger module 202 (FIG. 2A). In some embodiments, the network of the first RAT may be an E-UTRAN. In some embodiments, the network of the first RAT may be an UTRAN. The ESS may be a state in which some functions of the source cell are restricted in resource usage. In some embodiments, operation 502 may include determining when operating conditions within the source cell have reached a trigger point (e.g., a load threshold for the source cell) at which an eNB is to activate an ESS. In some embodiments, operation 502 may include determining that the eNB or other NE associated with the source cell supports inter-RAT ES. If ESM IRP manager module 200 determines "no" at operation 502, process 500 may end.

If ESM IRP manager module 200 determines "yes" at operation 502, ESM IRP manager module 200 may proceed to operation 504, and may determine whether the source cell is partially overlapped by each of a plurality of cells of one or more networks of one or more RATs different from the first RAT. In some embodiments, operation 504 may be executed by overlap module 204 (FIG. 2A). In some embodiments, operation 504 may include determining a set of ES-coverage attributes (e.g., as illustrated in Table 1) according to process 400 of FIG. 4 or another ES-coverage attribute determination process. In some embodiments, operation 504 may include accessing and analyzing a set of stored ES-coverage attributes. In some embodiments, the network of the first RAT may be an E-UTRAN. In some embodiments, the one or more networks of the one or more RATS different from the first RAT may include one or more of a UTRAN or a GERAN. In some embodiments, the source cell may provide capacity enhancement to, but does not cover, an UTRAN or a GERAN coverage hole. If ESM IRP manager module 200 determines "no" at operation 504, process 500 may end.

If ESM IRP manager module 200 determines "yes" at operation 504, ESM IRP manager module 200 may proceed to operation 506 and determine whether a combination of the plurality of cells provides coverage of the source cell. In some embodiments, operation 506 may be executed by overlap module 204 (FIG. 2A). If ESM IRP manager module 200 determines "no" at operation 506, process 500 may end. In some embodiments, a source cell may be completely or partially covered by multiple target cells (e.g., cells stored with a "yes" or other ES-coverage attribute value at operation 408 of FIG. 4). In such embodiments, one or more of the target cells may be chosen to compensate the source cell when it activates an ESS (based on, e.g., the traffic load of the target cells).

If ESM IRP manager module 200 determines "yes" at operation 506, ESM IRP manager module 200 may proceed to operation 508 and instruct the source cell to activate an ESS. In some embodiments, operation 508 may be executed by instruction module 206 (FIG. 2A). To mitigate service disruptions, the traffic handled by the source cell prior to activating the ESS may be handed over to the covering cells identified at operations 502 and 504 (e.g., according to the current loads of the covering cells).

At operation 510, ESM IRP manager module 200 may transmit a notification message for display to a network operator (e.g., at a visual display device) when the source cell has activated an ESS. In some embodiments, operation 510 may be executed by notification module 208 (FIG. 2A). For example, then ESM IRP manager module 200 is included in an eNB (such as eNB 308 of FIG. 3), operation 510 may including notifying an NM apparatus when the eNB has activated an ESS (e.g., based on a trigger point being reached per operation 502 and a combination of a plurality of inter-RAT cells providing coverage of the source cell per operations 504 and 506). In some embodiments, the notification of operation 510 may include the identities of the plurality of cells whose combination provides coverage of the source cell (e.g., the cell identifiers of the plurality of cells).

At operation 512, ESM IRP manager module 200 may determine whether a traffic load on one or more of the plurality of cells exceeds a threshold. In some embodiments, operation 512 may be executed by one or more of trigger module 202 and instruction module 206 (FIG. 2A). If ESM IRP manager module 200 determines "no" at operation 512, process 500 may end.

If ESM IRP manager module 200 determines "yes" at operation 512, ESM IRP manager module 200 may proceed to operation 514 and determine whether the plurality of cells are in a compromised operational status (e.g., whether any of the cells have overloaded or failed). In some embodiments, operation 514 may be executed by one or more of trigger module 202 and instruction module 206 (FIG. 2A). If ESM IRP manager module 200 determines "no" at operation 514, process 500 may end.

If ESM IRP manager module 200 determines "yes" at operation 514, ESM IRP manager module 200 may proceed to operation 516 and instruct the source cell to deactivate the ESS. In some embodiments, operation 516 may be executed by instruction module 206 (FIG. 2A). Process 500 may then end.

Figure 6:
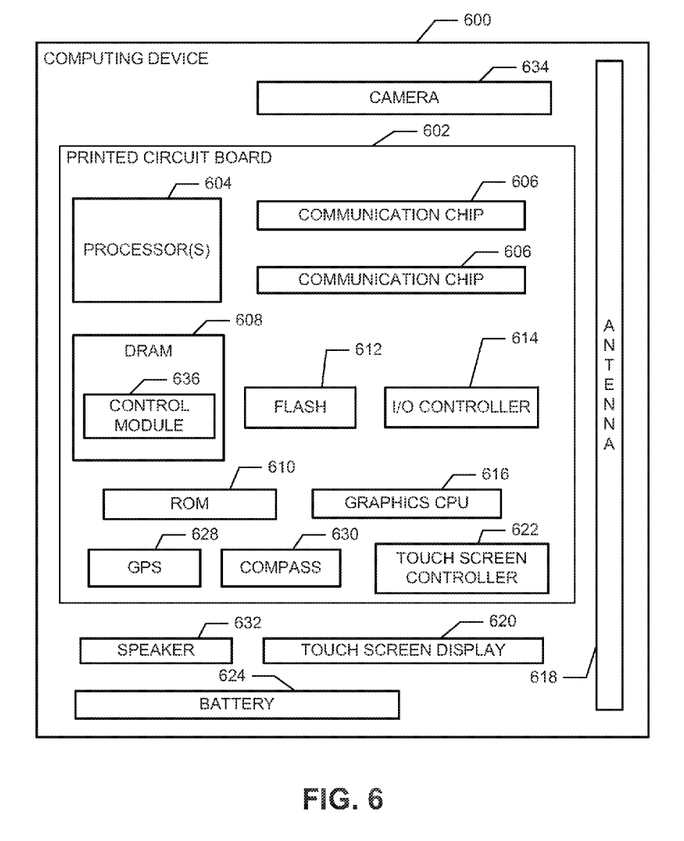
FIG. 6 is a block diagram of an example computing device suitable for practicing the disclosed embodiments, in accordance with various embodiments.

FIG. 6 is a block diagram of example computing device 600, which may be suitable for practicing various disclosed embodiments. For example, some or all of the components of computing device 600 may be used in any of the components of system 300 of FIG. 3. Computing device 600 may include a number of components, including one or more processor(s) 604 and at least one communication chip 606. In various embodiments, processor 604 may include a processor core. In various embodiments, at least one communication chip 606 may also be physically and electrically coupled to processor 604. In further implementations, communication chips 606 may be part of processor 604. In various embodiments, computing device 600 may include PCB 602. For these embodiments, processor 604 and communication chip 606 may be disposed thereon. In alternate embodiments, the various components may be coupled without the employment of PCB 602. Communication chip 606 may be included in any of the receiver and/or transmitter modules described herein.

Depending on its applications, computing device 600 may include other components that may or may not be physically and electrically coupled to PCB 602. These other components include, but are not limited to, volatile memory (e.g., dynamic random access memory 608, also referred to as DRAM), non-volatile memory (e.g., read-only memory 610, also referred to as "ROM," one or more hard disk drives, one or more solid-state drives, one or more compact disc drives, and/or one or more digital versatile disc drives), flash memory 612, input/output controller 614, a digital signal processor (not shown), a crypto processor (not shown), graphics processor 616, one or more antenna 618, touch screen display 620, touch screen controller 622, other visual display devices (such as liquid-crystal displays, cathode-ray tube displays and e-ink displays, not shown), battery 624, an audio codec (not shown), a video codec (not shown), global positioning system (GPS) device 628, compass 630, an accelerometer (not shown), a gyroscope (not shown), speaker 632, camera 634, and a mass storage device (such as hard disk drive, a solid state drive, compact disc (CD), digital versatile disc (DVD)) (not shown), and so forth. In various embodiments, processor 604 may be integrated on the same die with other components to form a System on Chip (SoC).

In various embodiments, volatile memory (e.g., DRAM 608), non-volatile memory (e.g., ROM 610), flash memory 612, and the mass storage device may include programming instructions configured to enable computing device 600, in response to execution by processor(s) 604, to practice all or selected aspects of the processes described herein. For example, one or more of the memory components such as volatile memory (e.g., DRAM 608), non-volatile memory (e.g., ROM 610), flash memory 612, and the mass storage device may include temporal and/or persistent copies of instructions that, when executed, enable computing device 600 to operate control module 636 configured to practice all or selected aspects of the processes described herein. Memory accessible to computing device 600 may include one or more storage resources that are physically part of a device on which computing device 600 is installed and/or one or more storage resources that is accessible by, but not necessarily a part of, computing device 600. For example, a storage resource may be accessed by computing device 600 over a network via communications chips 606.

Communication chips 606 may enable wired and/or wireless communications for the transfer of data to and from computing device 600. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. Many of the embodiments described herein may be used with WiFi and 3GPP/LTE communication systems. However, communication chips 606 may implement any of a number of wireless standards or protocols, including but not limited to IEEE 702.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Bluetooth, derivatives thereof, as well as any other wireless protocols that are designated as 3G, 4G, 5G, and beyond. Computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

In various implementations, computing device 600 may be a laptop, a netbook, a notebook, an ultrabook, a smart phone, a computing tablet, a personal digital assistant, an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, computing device 600 may be any other electronic device that processes data.

Computer-readable media (including non-transitory computer-readable media and/or tangible computer-readable media), methods, systems and devices for performing the above-described techniques are illustrative examples of embodiments disclosed herein. Additionally, other devices may be configured to perform various disclosed techniques.

The following paragraphs describe examples of various embodiments. In various embodiments, one or more non-transitory computer-readable media has instructions that, when executed, cause an IRP manager module of a management apparatus to: identify a source cell that supports inter-RAT energy saving, the source cell of a network of a first RAT that is a UTRAN or an E-UTRAN; identify a target cell that is proximate to the source cell, the target cell of a network of a second RAT that is different from the first RAT; store a first value for an energy-saving-coverage attribute corresponding to the target cell if the target cell is recommended to be considered as a candidate cell to take over coverage when the source cell is about to be transferred to an energy saving state; and store a second value, different from the first value, for the energy-saving-coverage attribute corresponding to the target cell if the target cell is recommended along with at least one other target cell to be considered as an entirety of candidate cells to take over coverage when the source cell is about to be transferred to the energy saving state. In some embodiments, the management apparatus is a network management (NM) apparatus. In some embodiments, the target cell is a UTRAN cell. In some embodiments, the UTRAN cell is an FDD mode cell, a low chip rate TDD mode cell, or a high chip rate TDD mode cell. In some embodiments, the target cell is a GERAN cell. In some embodiments, the first value is yes and the second value is partial. In some embodiments, the one or more non-transitory computer-readable media further includes instructions that, when executed, cause the IRP manager module to store a third value, different from the first and second values, for the energy-saving-coverage attribute corresponding to the target cell if the target cell is not recommended to be considered as a candidate cell to take over coverage when the source cell is about to be transferred to an energy saving state nor recommended along with at least one other target cell to be considered as an entirety of candidate cells to take over coverage when the source cell is about to be transferred to the energy saving state. In some embodiments, the energy-saving-coverage attribute is part of an information object class containing radio network-related parameters. Some embodiments of one or more computer readable media include various combinations of the foregoing.

In various embodiments, an NM apparatus includes: a trigger module to determine that a source cell of a network of a first RAT is triggered to activate an energy saving state; an overlap module to determine that the source cell is partially overlapped by each of a plurality of cells of one or more networks of one or more RATs different from the first RAT; and an instruction module to instruct the source cell to activate the energy saving state when a combination of the plurality of cells provides coverage of the source cell. In some embodiments, the network of the first RAT is an E-UTRAN. In some embodiments, the one or more networks of one or more RATS different from the first RAT include one or more of a UTRAN or a GERAN. In some embodiments, the source cell provides capacity enhancement to, but does not cover, a UTRAN coverage hole or a GERAN coverage hole. In some embodiments, the instruction module is further to instruct the source cell to deactivate the energy saving state after instructing the source cell to activate the energy saving state. In some embodiments, the instruction module is to instruct the source cell to deactivate the energy saving state based on a traffic load of one or more of the plurality of cells or based on an operational status of one or more of the plurality of cells. In some embodiments, the plurality of cells include a first cell and a second cell, a first portion of the source cell is covered by the first cell but not the second cell, a second portion of the source cell is covered by the second cell but not the first cell, and a third portion of the source cell is covered by the first cell and the second cell. In some embodiments, the NM apparatus further includes a notification module to transmit a notification message for display to a network operator when the source cell has activated the energy saving state. In some embodiments, the NM apparatus further includes a visual display device to display the notification message transmitted by the notification module. In some embodiments, the energy saving state includes a state in which some functions of the source cell are restricted in resource usage. Some embodiments of an NM apparatus include various combinations of the foregoing.

In various embodiments, an eNB, serving a source cell of a network of a first RAT, includes: a trigger module to determine when operating conditions within the source cell have reached a trigger point at which the eNB is to activate an energy saving state; an overlap module to determine that the source cell is partially overlapped by each of a plurality of cells of one or more networks of one or more RATs different from the first RAT; and a notification module to notify an NM apparatus when the eNB has activated the energy saving state, the eNB entering the energy saving state based on the trigger point being reached and a combination of the plurality of cells providing coverage of the source cell. In some embodiments, the eNB further includes an instruction module to instruct the eNB to activate the energy saving state when the trigger point is reached and a combination of the plurality of cells provide coverage of the source cell. In some embodiments, the instruction module is further to instruct the eNB to deactivate the energy saving state. In some embodiments, the trigger module is further to determine that the eNB supports inter-RAT energy saving, prior to instruction of the eNB by the instruction module. In some embodiments, the trigger point includes a load threshold crossing value. In some embodiments, the network of the first RAT includes a UTRAN or an E-UTRAN. In some embodiments, the network of the first RAT includes an E-UTRAN and the one or more networks of the one or more RATs different from the first RAT include a UTRAN or a GERAN. In some embodiments, the notification module is further to notify the NM apparatus of identifiers of the plurality of cells whose combination provides coverage of the source cell. In some embodiments, the plurality of cells provides complete coverage of the source cell. Some embodiments of an eNB include various combinations of the foregoing.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. One or more non-transitory computer-readable media having instructions that, when executed, cause an integration reference point (IRP) manager module of a management apparatus to:
    identify a source cell that supports inter-radio access technology (RAT) energy saving, the source cell of a network of a first RAT that is a universal mobile telecommunications system terrestrial radio access network (UTRAN) or an evolved universal terrestrial radio access network (E-UTRAN), wherein the source cell has a coverage area and a user equipment (UE) outside the coverage area cannot be covered by the source cell;
    identify a target cell that is proximate to the source cell, the target cell of a network of a second RAT that is different from the first RAT;
    store a first value for an energy-saving-coverage attribute corresponding to the target cell if the target cell is recommended to be considered as a single candidate cell to take over coverage when the source cell is about to be transferred to an energy saving state, wherein the target cell is recommended to be considered as a single candidate cell when a coverage area of the target cell encompasses the coverage area of the source cell; and
    store a second value, different from the first value, for the energy-saving-coverage attribute corresponding to the target cell if the target cell is recommended along with at least one other target cell to be considered as an entirety of candidate cells to take over coverage when the source cell is about to be transferred to the energy saving state, wherein the target cell is recommended along with at least one other target cell to be considered as an entirety of candidate cells when a combination of coverage areas of the target cell and the at least one other target cell encompasses the coverage area of the source cell, and wherein the target cell and the at least one other target cell have different coverage areas.

2. The one or more non-transitory computer-readable media of claim 1, wherein the management apparatus is a network management (NM) apparatus.

3. The one or more non-transitory computer-readable media of claim 1, wherein the target cell is a UTRAN cell.

4. The one or more non-transitory computer-readable media of claim 3, wherein the UTRAN cell is a frequency division duplex (FDD) mode cell, a low chip rate time division duplex (TDD) mode cell, or a high chip rate TDD mode cell.

5. The one or more non-transitory computer-readable media of claim 1, wherein the target cell is a global system for mobile communications enhanced data rates for global system for mobile communication evolved radio access network (GERAN) cell.

6. The one or more computer-readable media of claim 1, wherein the first value is yes and the second value is partial.

7. The one or more non-transitory computer-readable media of claim 1, further comprising instructions that, when executed, cause the IRP manager module to:
store a third value, different from the first and second values, for the energy-saving-coverage attribute corresponding to the target cell if the target cell is not recommended to be considered as a candidate cell to take over coverage when the source cell is about to be transferred to an energy saving state nor recommended along with at least one other target cell to be considered as an entirety of candidate cells to take over coverage when the source cell is about to be transferred to the energy saving state.

8. The one or more non-transitory computer-readable media of claim 1, wherein the energy-saving-coverage attribute is part of an information object class containing radio network-related parameters.

9. A network management (NM) apparatus, comprising:
a trigger module to determine that a source cell of a network of a first radio access technology (RAT) is triggered to activate an energy saving state, wherein the source cell has a coverage area and a user equipment (UE) outside the coverage area cannot be covered by the source cell;
an overlap module to determine that the coverage area of the source cell is either encompassed by a coverage area of a single target cell of a network of a RAT different from the first RAT or encompassed by a combination of different coverage areas of a plurality of cells of one or more networks of one or more RATs different from the first RAT; and
an instruction module to instruct the source cell to activate the energy saving state is either encompassed by a coverage area of a single target cell of a network of a RAT different from the first RAT or encompassed by a combination of different coverage areas of a plurality of cells of one or more networks of one or more RATs different from the first RAT.

10. The NM apparatus of claim 9, wherein the network of the first RAT is an evolved universal terrestrial radio access network (E-UTRAN).

11. The NM apparatus of claim 10, wherein the one or more networks of one or more RATS different from the first RAT comprise one or more of a universal mobile telecommunications system terrestrial radio access network (UTRAN) or a global system for mobile communications enhanced data rates for global system for mobile communication evolved radio access network (GERAN).

12. The NM apparatus of claim 9, wherein the source cell provides capacity enhancement to, but does not cover, a universal mobile telecommunications system terrestrial radio access network (UTRAN) coverage hole or a global system for mobile communications enhanced data rates for global system for mobile communication evolved radio access network (GERAN) coverage hole.

13. The NM apparatus of claim 9, wherein the instruction module is further to:
instruct the source cell to deactivate the energy saving state after instructing the source cell to activate the energy saving state.

14. The NM apparatus of claim 13, wherein the instruction module is to instruct the source cell to deactivate the energy saving state based on a traffic load of one or more of the plurality of cells or based on an operational status of one or more of the plurality of cells.

15. The NM apparatus of claim 9, wherein the plurality of cells comprise a first cell and a second cell, a first portion of the source cell is covered by the first cell but not the second cell, a second portion of the source cell is covered by the second cell but not the first cell, and a third portion of the source cell is covered by the first cell and the second cell.

16. The NM apparatus of claim 9, further comprising:
a notification module to transmit a notification message for display to a network operator when the source cell has activated the energy saving state.

17. The NM apparatus of claim 16, further comprising:
a visual display device to display the notification message transmitted by the notification module.

18. The NM apparatus of claim 9, wherein the energy saving state comprises a state in which some functions of the source cell are restricted in resource usage.

19. An evolved nodeB (eNB) serving a source cell of a network of a first radio access technology (RAT), the eNB comprising:
a trigger module to determine when operating conditions within the source cell have reached a trigger point at which the eNB is to activate an energy saving state, wherein the source cell has a coverage area and a user equipment (UE) outside the coverage area cannot be covered by the source cell;
an overlap module to determine that the coverage area of the source cell is either encompassed by a coverage area of a single target cell of a network of a RAT different from the first RAT or encompassed by a combination of different coverage areas of a plurality of cells of one or more networks of one or more RATs different from the first RAT; and
a notification module to notify a network management (NM) apparatus when the eNB has activated the energy saving state, wherein the eNB activates the energy saving state based on the trigger point being reached and the coverage area of the source cell being either encompassed by a coverage area of a single target cell of a network of a RAT different from the first RAT or encompassed by a combination of different coverage areas of a plurality of cells of one or more networks of one or more RATs different from the first RAT.

20. The eNB of claim 19, further comprising:
an instruction module to instruct the eNB to activate the energy saving state when the trigger point is reached and a combination of the plurality of cells provide coverage of the source cell.

21. The eNB of claim 20, wherein the instruction module is further to:
instruct the eNB to deactivate the energy saving state.

22. The eNB of claim 20, wherein the trigger module is further to:
determine that the eNB supports inter-RAT energy saving, prior to instruction of the eNB by the instruction module.

23. The eNB of claim 19, wherein the trigger point comprises a load threshold crossing value.

24. The eNB of claim 19, wherein the network of the first RAT comprises a universal mobile telecommunications system terrestrial radio access network (UTRAN) or an evolved universal terrestrial radio access network (E-UTRAN).

25. The eNB of claim 19, wherein the network of the first RAT comprises an evolved universal terrestrial radio access network (E-UTRAN) and the one or more networks of the one or more RATs different from the first RAT comprise a universal mobile telecommunications system terrestrial radio access network (UTRAN) or a global system for mobile communications enhanced data rates for global system for mobile communication evolved radio access network (GERAN).

26. The eNB of claim 19, wherein the notification module is further to:
notify the NM apparatus of identifiers of the plurality of cells whose combination provides coverage of the source cell.

27. The eNB of claim 19, wherein the plurality of cells provides complete coverage of the source cell.

28. One or more non-transitory computer-readable media having instructions that, when executed, cause an integration reference point (IRP) manager module of a management apparatus to:
identify a source cell that supports inter-radio access technology (RAT) energy saving, the source cell of a network of a first RAT that is a universal mobile telecommunications system terrestrial radio access network (UTRAN) or an evolved universal terrestrial radio access network (E-UTRAN);
identify a target cell that is proximate to the source cell, the target cell of a network of a second RAT that is different from the first RAT;
store a first value for an energy-saving-coverage attribute corresponding to the target cell if the target cell is recommended to be considered as a candidate cell to take over coverage when the source cell is about to be transferred to an energy saving state;
store a second value, different from the first value, for the energy-saving-coverage attribute corresponding to the target cell if the target cell is recommended along with at least one other target cell to be considered as an entirety of candidate cells to take over coverage when the source cell is about to be transferred to the energy saving state; and
store a third value, different from the first and second values, for the energy-saving-coverage attribute corresponding to the target cell if the target cell is not recommended to be considered as a candidate cell to take over coverage when the source cell is about to be transferred to an energy saving state nor recommended along with at least one other target cell to be considered as an entirety of candidate cells to take over coverage when the source cell is about to be transferred to the energy saving state.

\* \* \* \* \*